US010855646B2

(12) United States Patent
Hopkins et al.

(10) Patent No.: US 10,855,646 B2
(45) Date of Patent: *Dec. 1, 2020

(54) DNS RENDEZVOUS LOCALIZATION (71) Applicant: Level 3 Communications, LLC, Broomfield, CO (US)

(72) Inventors: William Hopkins, Brighton, CO (US); Joelle T. Maslak, Golden, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,776

(22) Filed: Aug. 22, 2019

(65) Prior Publication Data

US 2019/0379631 A1 Dec. 12, 2019

Related U.S. Application Data (63) Continuation of application No. 16/160,872, filed on Oct. 15, 2018, now Pat. No. 10,397,180, which is a continuation of application No. 14/749,461, filed on Jun. 24, 2015, now Pat. No. 10,104,036.

(60) Provisional application No. 62/016,425, filed on Jun. 24, 2014.

(51) Int. Cl.
H04L 29/12 (2006.01)
H04L 29/08 (2006.01)

(52) U.S. Cl.
CPC ...... *H04L 61/1511* (2013.01); *H04L 67/1021* (2013.01); *H04L 67/327* (2013.01); *H04L 61/609* (2013.01)

(58) Field of Classification Search
None
See application file for complete search history.

(56) References Cited

U.S. PATENT DOCUMENTS

| 2003/0002484 A1 | 1/2003 | Freedman |
| 2010/0161760 A1 | 6/2010 | Maloo |
| 2010/0281388 A1 | 11/2010 | Kane et al. |
| 2011/0153941 A1 | 6/2011 | Spatscheck et al. |
| 2012/0246308 A1 | 9/2012 | Gerber et al. |
| 2012/0306741 A1 | 12/2012 | Gupta |
| 2013/0282897 A1 | 10/2013 | Siegel et al. |
| 2013/0297596 A1 | 11/2013 | Mouline et al. |
| 2014/0173030 A1 | 6/2014 | Varney et al. |

(Continued)

OTHER PUBLICATIONS

European Examination Report, dated Jun. 28, 2019, Application No. 15812386.9, filed Jun. 24, 2015; 3 pgs.

(Continued)

*Primary Examiner* — Jeffrey R Swearingen (57) ABSTRACT

A method of generating a routing table containing information as to the weighted distance between client's that use a resolver and each rack gateway, taking into account how traffic to each client can egress from the CDN AS. The routing table is generated from matrix multiplication of two matrices. One matrix contains information as to the proportion of each client's use of each resolver in a first autonomous system. The second matrix contains information as to the distance between each client and each rack, with respect to an egress gateway, in a second autonomous system. The resulting routing table is used to identify a gateway from which to serve content to a client.

20 Claims, 5 Drawing Sheets

(56) References Cited

U.S. PATENT DOCUMENTS

| | | | |
|---|---|---|---|
| 2015/0058488 A1* | 2/2015 | Backholm | H04L 47/286 709/226 |
| 2015/0341428 A1* | 11/2015 | Chauhan | H04L 12/6418 709/203 |
| 2015/0372969 A1 | 12/2015 | Hopkins et al. | |
| 2019/0052596 A1 | 2/2019 | Hopkins et al. | |

OTHER PUBLICATIONS

European Examination Report, dated Nov. 30, 2018, Application No. 15812386.9, filed Jun. 24, 2015; , 6 pgs.

Extended European Search Report, dated Jan. 18, 2018, Application No. 15812386.9, filed Jun. 24, 2015; , 6 pgs.

International Preliminary Report on Patentability, dated Dec. 27, 2016, Int'l Appl. No. PCT/US15/037510, Int'l Filing Date Jun. 24, 2015; , 8 pgs.

International Search Report dated Sep. 15, 2015, Int'l Appl. No. PCT/US15/037510, Int'l Filing Date Jun. 24, 2015; , 3 pgs.

Written Opinion of the International Searching Authority dated Sep. 15, 2015, Int'l Appl. No. PCT/US15/037510, Int'l Filing Date Jun. 24, 2015; , 6 pgs.

Contavalli, C. et al., "Client IP information in DNS requests draft-vandergaast-edns-client-ip-01.txt", Internet Engineering Task Force, IETF; Standardworkingdraft, Internet Society (ISOC) 4, Rue des Falaises CH—1205 Geneva, Switzerland; No. 1, XP015068632 May 21, 2010 00:00:00.0 , pp. 1-23.

* cited by examiner

202 Client IP

204 Resolver IP

| | A | B | C | D |
|---|---|---|---|---|
| 11.22.33.44 (Resolver 1) | 0.1 | 0.2 | 0.3 | 0.4 |
| Resolver 2 | - | - | - | - |
| Resolver 3 | - | - | - | - |
| Resolver 4 | - | - | - | - |

210 Rack

202 Client IP

| | DEN | DAL | SEA | ATL |
|---|---|---|---|---|
| A | 1 | 751 | - | - |
| B | 2 | 752 | - | - |
| C | 3 | 753 | - | - |
| D | 2 | 752 | - | - |

DNS RENDEZVOUS LOCALIZATION

CROSS-REFERENCE TO RELATED APPLICATIONS

This application is a continuation of and claims the benefit of priority from U.S. patent application Ser. No. 16/160,872, filed Oct. 15, 2018, now U.S. Pat. No. 10,397,180, which is a continuation of U.S. patent application Ser. No. 14/749,461, filed Jun. 24, 2015, now U.S. Pat. No. 10,104,036, which claims priority under 35 U.S.C. § 119(e) from U.S. Provisional Patent Application No. 62/016,425, filed Jun. 24, 2014, the entire contents of each of which are fully incorporated herein by reference.

TECHNICAL FIELD

Aspects of the present disclosure generally relate to content delivery networks or otherwise delivering content using a network. More specifically, embodiments relate to identifying rack or racks from which to serve content to clients.

BACKGROUND

The Internet and the World Wide Web (the "Web") have become ubiquitous. Thousands or even tens of thousands of content providers (publishers) now use the Internet (and, particularly, the Web) to provide all sorts of content to numerous clients all over the world. In order to offload the job of serving some or all of their content, many content providers now subscribe to content delivery networks (CDNs). Using a CDN, content can be served to clients from the CDN (i.e., from one or more servers in the CDN) instead of from the content provider's server(s). In a caching CDN, content may also be cached on some or all of the CDN servers, either before being served or in response to specific requests for that content. Having content cached within edge servers of the CDN enhances the performance of the CDN because the content does not have to be retrieved from origin servers or other locations, which are less efficient than edge servers in providing content.

Content is constantly being accessed from networks. For example, television shows and movies may now be accessed from any number of Web sites. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once only provided on disc and mailed to recipients, are now routinely distributed to devices using only network connections. All of these forms of content may be distributed using CDNs.

SUMMARY

Embodiments generally disclosed herein include a method of generating a routing table, which is used in and part of a router or other network device to direct traffic amongst devices in a network. The method comprises obtaining a portional use relationship, a distance relationship, and a relationship between the plurality of resolvers and plurality of content serving devices. The portional use relationship is the relationship between a plurality of client devices within a first autonomous system and a plurality of resolvers with the first autonomous system. The distance relationship is the relationship between the plurality of client devices and a plurality of content serving devices in a second autonomous system, with respect to at least one egress gateway of the second autonomous system and to which content from at least one of the content serving devices egresses to the first autonomous system. The relationship between the plurality of resolvers and plurality of content serving devices is obtained using the portional use relationship and the distance relationship and is used to populate the routing table involved in resolving a content request from the plurality of client devices.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve a method for identifying a gateway (e.g. one or more content locations having servers, which may be edge servers) from which to serve content to a client. While a CDN may have numerous gateways with content able to serve a request, some of those gateways (racks) may be suboptimal to serve a request for any number of reasons. For example, the rack may be geographically and/or logically remote from the client requesting the content, which introduces latency and cost, among other factors, in servicing the request relative to another rack that may be geographically and/or logically more proximate the client. In one aspect, the method involves routing content requests within a CDN using client information, such as geographic location, the portion of client traffic using various possible resolvers (each within an ASN), and the distance between a client, through various possible gateways, to a rack housing the content of interest for a request from the client. The present application references racks as well as gateways. Depending on any given implementation, racks may be identified but more likely gateways (having one or more racks) will be identified. In some instances, a metro area, having one or more gateways, may be identified. In many instances, however, only racks will be referenced for ease of discussion.

More particularly, the methodologies and devices set out herein provide a mechanism to determine a location to rendezvous domain name service (DNS) requests from resolvers, given the often geographically heterogeneous nature of the set of clients associated with the resolvers. More specifically, any given client is not necessarily geographically proximate the resolver. A resolver processes client DNS requests and otherwise to resolve and access content from a network, such as the Internet or a CDN. Moreover, when a resolver processes a DNS request for a client, the resolver's connection to DNS does not contain the client's IP address; therefore, the DNS system only knows the resolver's requesting IP address. While many conventional systems use the resolver location, based on its IP address, as a proxy for the client's location, such systems do not always rendezvous a client request to the best resource to serve the request given the heterogeneous client relationships to resolvers.

In general, aspects of the present disclosure involve the creation of two matrices of data points and the combination and use of those two matrices to yield an output by which client requests can be routed within a CDN. The output may be in the form of a table or other data structure that may be distributed to DNS servers or other devices and may be used to resolve from which network location to serve a request for content and to resolve content requests. The first "client-to-resolver" matrix contains the fraction (value 0 to 1) of all requests that each client IP address represents for a resolver that is used to access the CDN. In many instances, the resolver will be the resolver of an Internet Service Provider (ISP)—ISP resolver—that a client device within the ISP's autonomous system number (ASN) uses to resolve a content request. For example, if a user selects a link within an HTML document displayed in a browser and that link is for a video asset (e.g. content), the browser contacts the resolver in order to obtain an IP address for a content rack that may be able to serve the requested content. The resolver contacts the DNS system, which may involve name servers, authoritative name servers, and other components, and eventually delivers to the client device a network address to service the request. Regardless of the form for which the data is used, the first set of data involves a relationship between each client and the resolver resolving requests for content, and the portion of traffic each client represents for any given resolver.

The term "content" as used herein means any kind of data, in any form, regardless of its representation and regardless of what it represents. Content may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" is sometimes used herein to refer to content.

The second "client-to-rack distance" matrix contains the great circle distance (GCD) in meters (or some other form of distance measurement) from each client IP address of interest to all of the CDN racks determined to be of interest, by proximity, to a destination AS egress gateway. In some instances, the egress gateway will be immediately proximate to CDN content racks, and hence the matrix entry will reflect the distance between the gateway and the client. Stated differently, when the egress gateway is proximate content racks, the distance to the client is simply the distance to the egress gateway as it is located in the same place as the rack. In other instances, a gateway may be some distance from content racks, and hence the matrix entry will involve the distance between the client and the gateway, and the distance between the gateway and a content rack within the CDN.

To account for client location and other factors, one specific aspect of the present disclosure generates a table or other data form used by DNS to rendezvous' client requests, where the table is generated using the client-to-resolver matrix, which may be the transpose thereof, multiplied by the client-to-rack distance matrix to give a weighted average distance to each rack location, which may be racks serving content from a content delivery network (CDN), from each resolver. The matrix multiplier creates a resolver-to-rack distance matrix, which is then used to select the best set of CDN rack locations for each resolver. While the term resolver-to-rack is used herein, the term encompasses different possible distance matrices that might be used. For example, a matrix of resolver to gateway or resolver to metro (where there are multiple gateways in close proximity within a metro) may be used. Thus, in some instances, for example when there are multiple racks within a gateway that might service a request, the system may use a resolver-to-gateway distance matrix, and other systems accounting for load balancing and other functionalities may select the specific rack within the gateway to serve the content. Nonetheless, a content request from the resolver will be processed, at least in part, using the resolver-to-rack distance to select the rack (and the IP address for the rack) to serve the content requested. The method accounts for client use of resolvers and geographic distances between clients and racks including content of interest, where the distance also accounts for the distance between the rack and a gateway by which a resolver accesses the rack.

Figure 1:
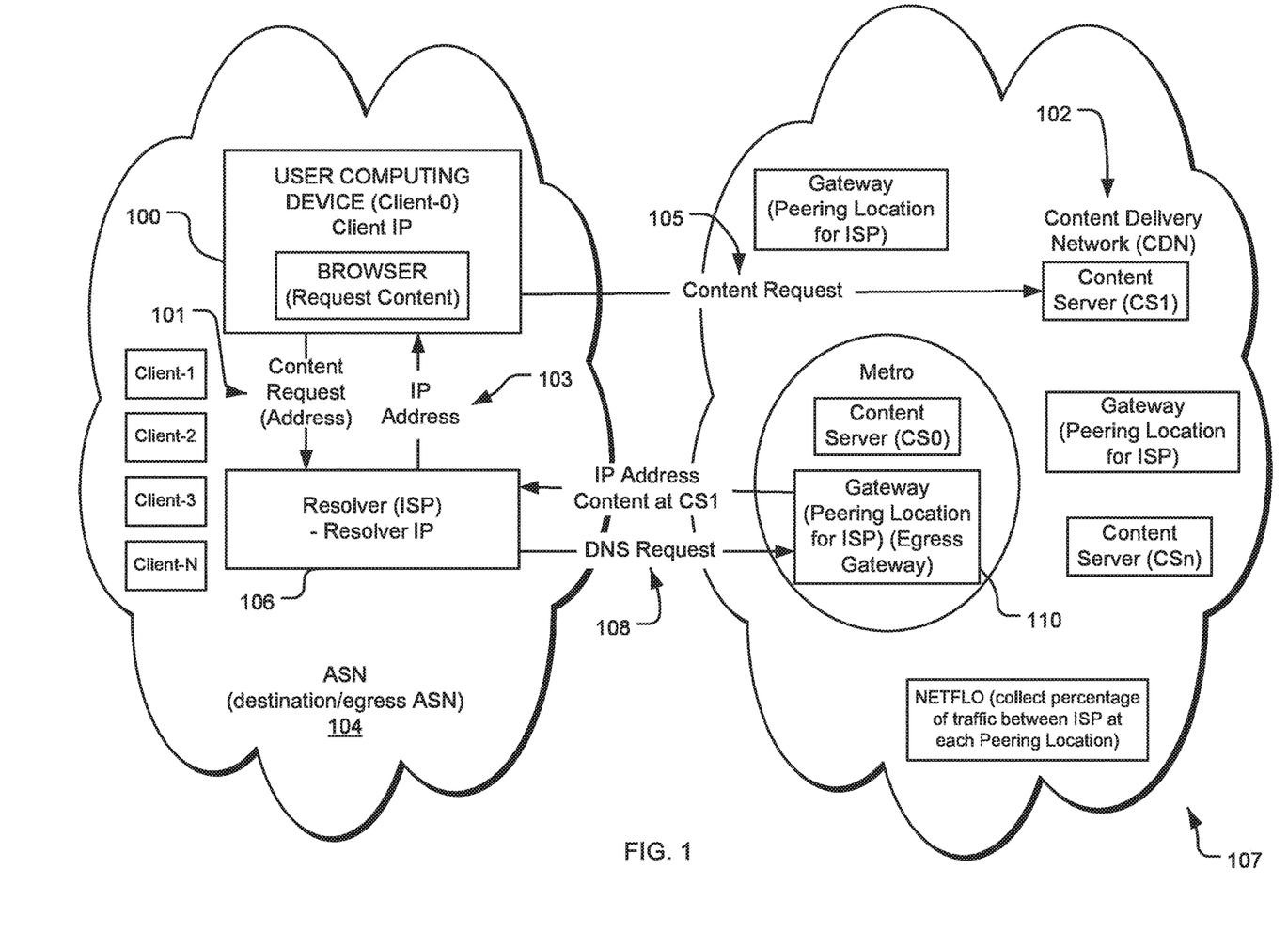
FIG. 1 is a system diagram depicting a first network autonomous system (AS) and a second (AS-CDN), and the various components involved in resolving a request from a client with the first network for content served from the second network, the resolution of the request using a resolution table or other information used by a DNS server to resolve a request from a resolver in the first network, according to aspects of the present disclosure.

FIG. 1 is a generalized network view of the relationship between a client device 100, often with a browser, requesting some form of content 105 that is served from a CDN 102. In this example, the client device 100 resides within an autonomous system (AS) identified by a specific ASN 104. Generally speaking, an AS encompasses a list of network addresses assigned or under the control of one entity. For purposes of illustration, an ISP typically operates a distinct AS identified by a specific ASN. Similarly, the CDN is also identified by a specific, and distinct, ASN 107. When the client device 100 makes a request for content, such as when the user selects a content link within an HTML page displayed within the browser, the browser contacts a resolver 106 assigned to or otherwise associated with the client, to begin the process of resolving the request and returning an IP address 103 from which the client may obtain the content. The resolver will contact a domain name service (DNS) server 108, among other possible functions and components, to resolve the request. Generally speaking, between the resolver 106, DNS, and oftentimes some functionality within the CDN, a network address, an IP address or the like is returned to the client device 100. In many instances, the client device 100 receives an IP address 103 of a rack within the CDN from which the content will be served. In one specific aspect, the resultant matrix generated through the methodologies set out herein, is used to update DNS servers with information as to process content requests to the CDN 105. Namely, in one specific example, requests emanating from a resolver will be handled by different racks within the CDN, and the matrix output creates the association between resolvers and racks. Hence, clients associated with a specific resolver will also be associated, albeit indirectly, with the same content racks as the resolvers. While aspects of the present disclosure are discussed herein relative to resolving a request for content being served from a CDN, the disclosure set out herein is useful in any system providing content and is not limited to a CDN environment. Moreover, the system set out herein may be employed to provide other services over a network such as the Internet.

Referring again to FIG. 1, the ISP 106 is interconnected with the CDN at a gateway. The gateway location within the CDN where there is a connection with an ISP is referred to as the egress gateway 100. In many instances, the ISP resolver is also associated with a gateway where there is a connection with the CDN egress gateway. In many instances, a gateway device involves an edge router or routers, where the interconnection is formed with an ISP router of the ISP's gateway.

Client-to-Resolver Matrix

There are various possible mechanisms by which the relationship between a client and a resolver may be identified. In one example, the system ingests or otherwise obtains data from a source, such as a system that creates a mapping of client IP addresses to resolver IPs. One such system is disclosed in U.S. patent Ser. No. 13/348,348 titled "Customized Domain Names in a Content Delivery Network (CDN)", which is hereby incorporated by reference herein. In one example, the data set comprises an entry for each metric collected for a particular client, including the date and time, the client IP address (which may be anonymized to a /24), the resolver IP address used by the client, among other metrics. In one possible implementation, the data is further enriched with a geographic identifier for the client IP address. For example, the data may be enriched with a latitude and longitude attribute for the client identifying the latitude and longitude measurement for a location associated with a client device. Further, for data processing purposes, the data used to generate the client-to-resolver matrix may be limited to the ASN for which optimization is being performed or for which aspects of the present disclosure are used to rendezvous (or otherwise route) client requests within a CDN.

Notably, the client data includes the client IP address and the resolver IP address used by the client. From this data, a list of client IP addresses is obtained and a list of resolver IP addresses is also obtained. The list of client IP addresses will, in most instances, greatly surpass the list of resolver IP addresses.

Figure 2A:
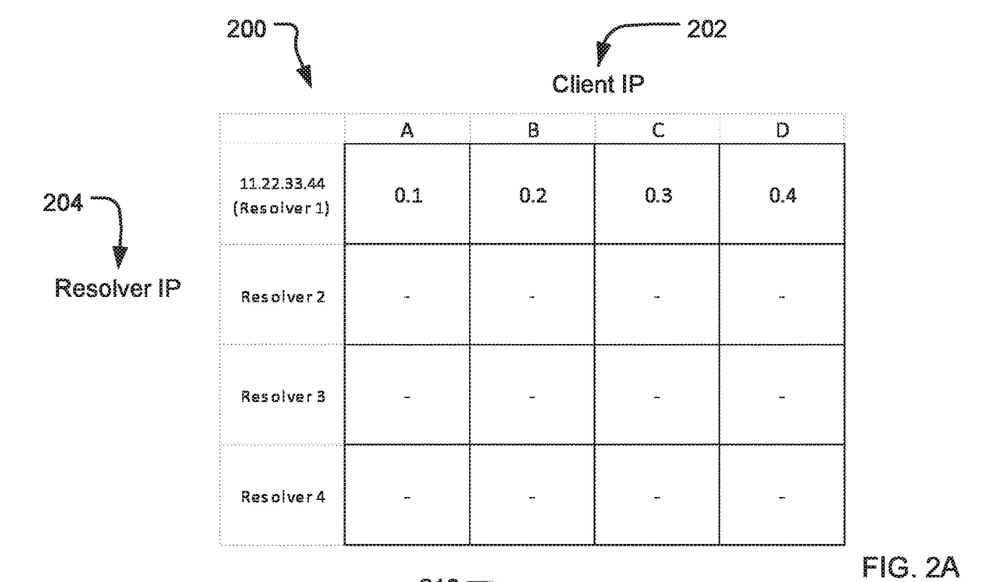
FIG. 2A is an example client-to-resolver matrix, according to aspects of the present disclosure.

FIG. 2A is a simplified example of the client-to-resolver matrix 200 and sample values. In this example, to further simplify, client IP addresses 202 are represented as A, B, C and D. In actuality the matrix may have entries for each actual client IP address 202 of interest, which addresses may be anonymized to a /24 value, or may otherwise be represented. Here, of the four clients identified, client A represents 0.1 (of 1) of all of the clients that use Resolver 1, client B represents 0.2 (of 1) of all of the clients that use Resolver 1, client C represents 0.3 (of 1) of all of the clients that use Resolver 1, and client D represents 0.4 (of 1) of all of the clients that use Resolver 1 to access the CDN. In this simple example, the four clients represent 100% of all traffic using the resolver 204, with A being 10%, B being 20%, C being 30% and D being 40%. This matrix creates an association between discrete client's use and the resolver being used by the client. In many instances, if not most, because of the assigned relationship between a client and a resolver by an ISP, each client will only be associated with one resolver. The fractional representation of the client's use of the resolver indicates how often each particular client accesses the resolver hence; generally speaking, busier clients will represent a higher fractional value than less busy clients. Moreover, the location of busier clients will affect the rack selection more than the location of less busy clients.

Determining the Distance from Resolver Clients to Cdn Racks (by Metro)

In order to obtain the information needed to generate and populate the matrices of interest, various data sources may be used. As mentioned above, a mapping of client IP addresses to resolver IP data may be used, for example. In another example, Border to Gateway Protocol (BGP) data may be used. In another example, network traffic data, such as from a Netflow® system may be used. Network traffic data may be obtained from a system as described in U.S. Publication Number US 2010/0281388 titled "Analysis of Network Traffic," published on Nov. 4, 2010 (application Ser. No. 12/698,004). The following table represents a small set of data useful for various aspects of the present disclosure.

|  | date | ingressCDN | egressGW | egressASN | dstASN | ipbusBytes |
|---|---|---|---|---|---|---|
| 15266 | YYYY-MM-DD | ZZ397.x | NY | XXX86 | XXX86 | 8.218246e+00 |
| 5472 | YYYY-MM-DD | ZZ557.x | SJ | XX50 | XX11 | 3.893168e+10 |
| 2847 | YYYY-MM-DD | ZZ642.x | STL | XX50 | XX50 | 2.759383e+12 |
| 7668 | YYYY-MM-DD | ZZ531.x | DAL | XX28 | XX29 | 1.867456e+10 |
| 10145 | YYYY-MM-DD | ZZ357.x | DAL | XX29 | XX29 | 2.473797e+10 |
| 13188 | YYYY-MM-DD | ZZ632.x | CHI | XX29 | XX29 | 7.899805e+09 |
| 26886 | YYYY-MM-DD | ZZ641.x | PIT | XXX86 | XXX86 | 1.292897e+10 |
| 7921 | YYYY-MM-DD | ZZ316.x | ATL | XX29 | XX29 | 3.571944e+09 |
| 15404 | YYYY-MM-DD | ZZ488.x | PIT | XXX86 | XXX86 | 1.932517e+10 |
| 26510 | YYYY-MM-DD | Z100.x | MIA | XX39 | XXX86 | 9.629244e+08 |

The table identifies the egress gateways that CDN traffic uses to egress to clients in particular destination ASNs. BGP routing information could provide the same egress gateway information, but the actual amount of traffic as denoted by ipbusBytes (bytes sent from the ingressCDN rack to the dstASN via the egressGW for the egressASN for the specified day) allows the gateways to be prioritized by the proportion of traffic carried. Knowledge of the actual amount of traffic also allows the list of egress gateways to be reduced by removing gateways responsible for insignificant traffic, which would be shown by a low ipbusBytes value. Removing egress gateways then reduces load downstream.

CDN Rack Information

Aspects of the present disclosure also take advantage of information (referred to as CDN Rack Data) concerning content racks, which may be racks of servers hosting and/or serving content within a CDN. The information includes the rack identification, a cluster id noting the cluster to which the rack belongs, a metro within where the rack resides, a gateway associated with the rack and the latitude and longitude for the location of the rack. As used herein the term "rack" references one or more servers, or other devices, tasked with serving content. While the term "rack" often may refer to the physical structure in which many servers may be organized and powered, in this application the term "rack" refers to the servers or other computing devices that serve or otherwise provide content. Since in a CDN, numerous servers are used and clustered to provide content, rather than referring to one discrete server, the term rack refers to all of the content servers disposed in a cabinet. In many instances, these racks of severs are also clustered with other racks. Finally, the servers within a rack may be considered edge servers in some CDN architectures.

The metro identifier references the metropolitan region in which the rack is deployed. In many instances, a CDN may span a vast geographic area. In the case of the United States, for example, a CDN may cover areas between the East and West coasts. Within the CDN, high capacity network connections, high performance network equipment, and racks may be focused in and around high population metropolitan regions with backbone connections between the metros. Thus, for example, the metro identifier will identify the metropolitan region where the rack is located—e.g., New York, Atlanta, Chicago, Dallas, or Seattle. Finally, the CDN rack data also includes latitude and longitude values for the location of each rack.

Egress-to-Rack Distance Matrix

An egress-to-rack distance matrix is a matrix of egress gateway to CDN gateway distances, in meters, for the set of egress gateways/metros that apply for the set of clients of interest as defined by the egress ASN's and the destination ASN's of each client. The system includes data identifying the egress gateways for each client of interest. The client IPs of interest generally belong to a particular AS (e.g., ISP). Each client IP is associated, via BGP, with an egress AS (the egress AS is from the perspective of the CDN AS—through which interconnect will traffic to the client egress). The egress AS of the client IP defines the set of egress gateways by which traffic to the client can egress from the CDN AS to the ISP of the client. The egress AS of a given client IP is determined from BGP. The CDN AS receives BGP routing data from all ASes with which it is interconnected. The BGP entries include an IP address block (defined using CIDR notation) and the AS Path, which describes the sequence of ASes that must be traversed from the CDN AS to the client's AS in order to reach the client. The first entry in the AS Path is the "egress AS" (the value is the number of the AS, so it is often referred to as the egress ASN); for a packet to travel from the CDN AS to the client, it egresses the CDN AS via an interconnect with the egress AS. Thus, for each client, the egress AS for the client IP defines the set of egress gateways through which CDN traffic will travel.

In some instances, the egress gateway will not include a rack. Accordingly, the system also includes CDN Rack information including the location of such racks. The egress-to-rack distance matrix identifies the various egress gateways and the various racks, and includes a distance parameter, which may be in meters, as the matrix entries. When the egress gateway includes the rack at the same location, then the matrix entry may be 0. In some specific instances, the matrix will only identify some limited subset of all content racks with the CDN. For example, the matrix may only include an entry for the three geographically closest racks to the egress gateway, rather than entries for all possible racks with the CDN. For purposes of optimizing system performance, distinct matrices may be generated and used at different possible levels of granularity. For example, the system may generate a matrix to only include CDN rack data for a particular egress gateway, for a particular resolver (which may access the CDN through more than one egress gateway), for a particular destination ASN (which may use more than one resolver and may access the CDN through more than one peering location (egress gateway)), or some combination thereof. Further, in some instances, construction of the client-to-egress distance matrix only consider those egresses, on a per client basis, that traffic to the client can egress from, given the clients' egress ASN.

As described herein, the system includes distance information between egress gateways and racks, and also includes distance information between clients and egress gateways. Accordingly, the system is able to determine the distance between clients and racks.

Client-to-Rack (Gateway) Distance Matrix

Figure 2B:
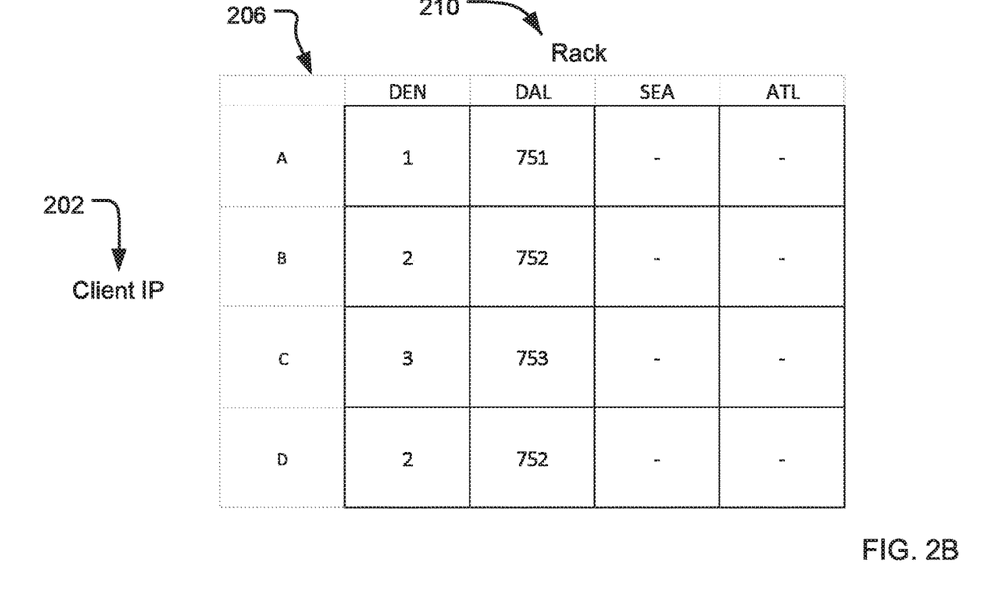
FIG. 2B is an example client-to-rack distance matrix, according to aspects of the present disclosure.

The client-to-rack distance matrix 206 contains the distance (GCD in meters) between each client IP address 208 for the destination ASNs of interest and all the gateways that CDN traffic to those clients can egress from the network. FIG. 2B is a simplified example of such a client-to-rack distance matrix. In this example, there are four clients (A-D) located in the Denver area. There are four racks 210 in the CDN—a rack in the Denver metro (DEN), a rack in a Dallas metro (DAL), a rack in a Seattle metro (SEA), and a rack in an Atlanta metro (ATL). An actual matrix would possibly include hundreds or thousands of clients, and numerous possible racks. As noted above, in many instances, the matrix will use a distance to a gateway rather than a distance to specific rack. So, with reference to the above example, there would be a gateway in Denver, a gateway in Dallas, a gateway in Seattle and a gateway in Atlanta (which each have racks from which content might be served). Thus, reference made herein to a rack is applicable to a gateway housing many racks. The systems set out herein would reference and choose the gateway (or metro), and then other systems including load balancers and the like would select a specific rack from with the gateway to serve the content. Often, there will be numerous racks within a metro or more than one gateway within a metro housing racks from content might be served, for example. In such an instance, the system may limit the number of possible racks (gateways) for any given client to some discrete number, such as three (3). Accordingly, when a request for content is processed, the system may initially select the closest rack for which to provide an IP address for the client to request content, and if that rack is unable to satisfy the request, then the system may select the second closest rack and so on. Referring again to FIG. 2B, here, the clients are each located most closely to the Denver rack (or Denver gateway) with distance values of 1 GCM, 2 GCM, 3 GCM and 4 GCM, respectively for clients A-D. The DAL rack is 751 GCM, 752 GCM, 753 GCM, and 752 GCM for clients A-D respectively.

Once the matrices are generated, the system multiplies the matrices and the result may be loaded into or otherwise provided to DNS in order to resolve content requests within the CDN. With respect to FIGS. 2A and 2B, the matrix multiplication is as follows:

$$(0.1)(1)+(0.2)(2)+0.3(3)+(0.4)2=2.2;\text{ and}$$

$$(0.1)751+(0.2)752+0.3(753)+0.4(752)=755.2$$

Figure 3:
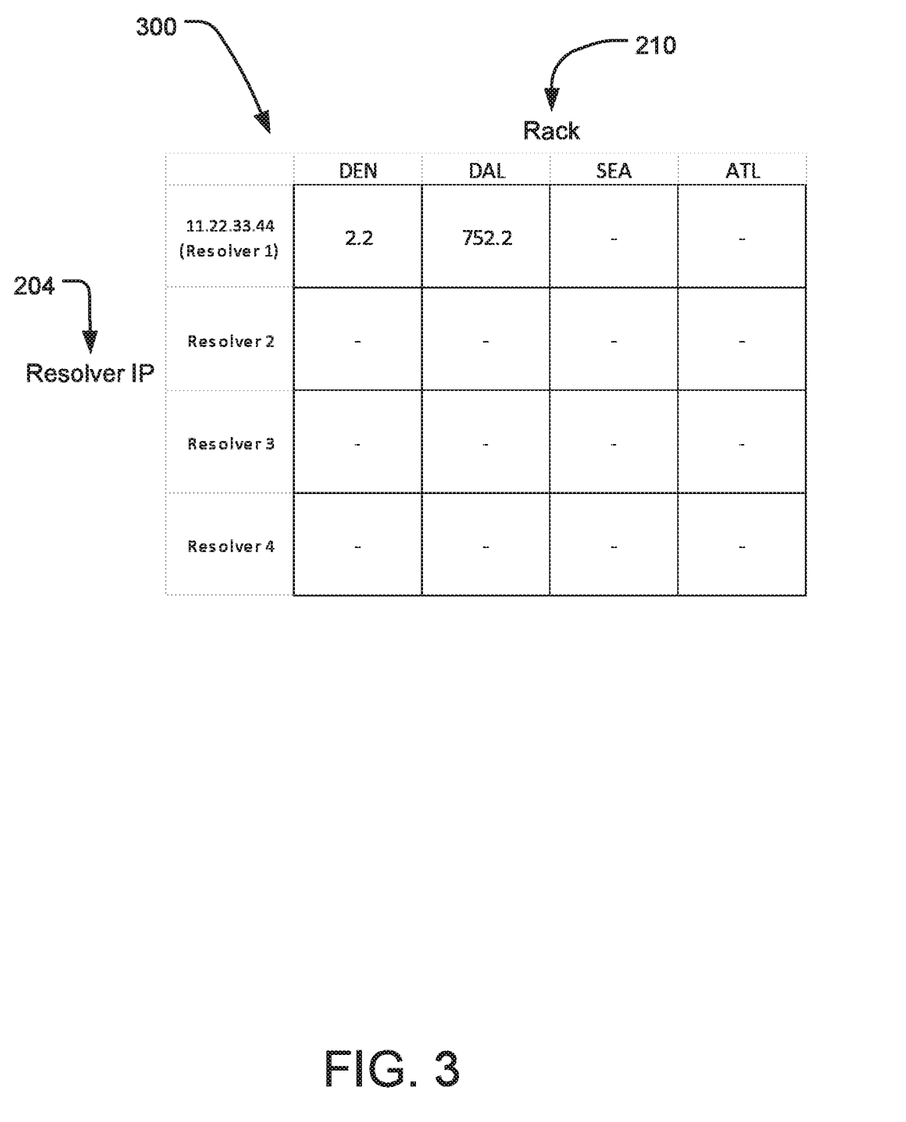
FIG. 3 is an example data table (e.g., matrix) obtained from linearly multiplying the client-to-resolver matrix with the client-to-rack distance matrix, which table may be useful in defining, revising, and/or optimizing a resolution table, according to aspects of the present disclosure.

The result of the multiplication of the matrices creates a result matrix such as shown in FIG. 3. Generally speaking, in the simplified example discussed herein, a request originating from resolver 1 will be given an IP address for the Denver rack, where the requested content will be served. Note, it is possible that the rack will not have the requested content, in which case it may be obtained and served using conventional techniques. It is also possible, in such instances, that the system will instead return the IP address of the next ranked rack 210 using the techniques discussed herein. Hence, for example, in the simple example discussed relative to FIGS. 2A and 2B, the IP address of the Dallas rack would be selected. In reality, there would likely be multiple racks distributed in the Denver metro and not proximate the same egress gateway, and one of those other racks in the Denver metro would be selected with only marginally higher output matrix values than the first rack. Examples referenced herein generally refer to IPv4 protocol but other protocols are also applicable such as IPv6.

Various enhancements and alternatives are possible to further optimize the systems and methods discussed herein. For example, the resolvers to use to rendezvous a request to the appropriate rack may be filtered to exclude those handling insignificant fractions of requests. This may be modified to make that determination within the context of each first target in the assigned sequence (fraction requests each resolver handles with respect to all the requests with the same first metro in the assignment sequence). In another example, resolvers with the same sequence of metro assignments and are contiguous in IP address space (no intervening resolver with a different assignment sequence occurs within the range of IP address) may be clustered to a single classless inter-domain routing (CIDR) group.

In one possible implementation, the geographic value (latitude and longitude) for a client may be associated with the 0.0 address of the client IP address /24 value, which is a good approximation representative capture when most or all clients in the /24 have the same or very similar longitude and latitude values. While the systems improve functionality and improve rendezvous localization regardless, it is not likely that all clients in a /24 will have the same or similar longitude and latitude values. To further improve performance, the system may query or otherwise obtain data from caching logs to get the actual proportion of clients at each longitude and latitude. In yet another alternative, each client IP address may be split into a set representing all the unique longitude and latitude values within the /24, and further be weighed by span of IP address space.

Figure 4:
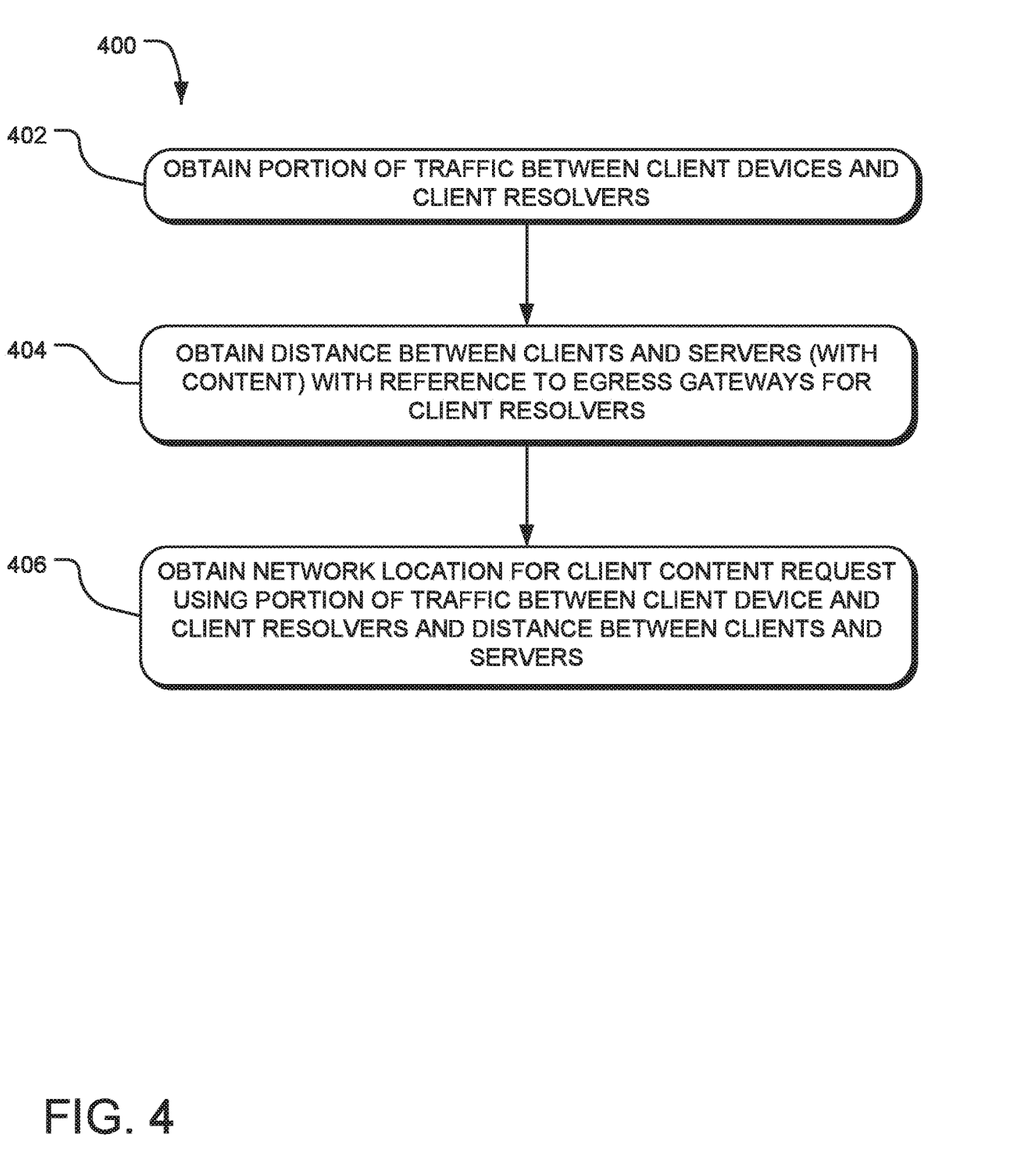
FIG. 4 is an example resolution table definition method, which is practiced by one or more processors and may be in the form of computer executable instructions, according to aspects of the present disclosure.

FIG. 4 is an example flow chart 400 of steps that show a method to determine the network location for client content. In step 402, the method obtains a portion of the traffic between client devices 100 and client resolvers 106. In step 404, the method obtains the distance between clients and servers (with content) with reference to egress gateways 110 for client resolvers. In step 406, the method then obtains the network location for client content using the portion of the traffic identified in 402 and the distance between clients and servers identified in 404. The network location for client content is used to identify a rack (gateway) from which to serve content to a client.

The resulting table from the matrix multiplication of the client-to-resolver matrix and the client-to-rack (gateway) distance provides the weighted mean distance from the clients using each particular resolver and the rack (gateway). Another step may also be performed in which, for each resolver, the rack (gateways) are sorted in order of distance. The preferred rack (gateway) for each resolver is the rack (gateway) with the shortest distance. The second preferred rack (gateway) is the second closest, and so on (one possible implementation is to pick the top five closest).

This can be used to create another matrix, resolver-to-closest-rack (gateways). Each row represents the sequence of preferred rack gateways for a particular resolver. The first column is for the most preferred, the second column is for the second preferred, and so on. The values of the matrix are the identifiers of the rack gateways:

TABLE 1

Sample Matrix of Resolver-to-Closest Rack (Gateway)

| | Rack gateway | | | | |
|---|---|---|---|---|---|
| resolver_ip | gw_1 | gw_2 | gw_3 | gw_4 | gw_5 |
| 209.XXX.YYY.222 | nyc | nwr | phi | bos | wdc |
| 109.XXX.YYY.28 | nyc | nwr | phi | bos | wdc |
| 72.XXX.YYY.58 | wdc | nyc | nwr | phi | ral |
| 75.XXX.YYY.217 | wdc | nyc | nwr | phi | chi |
| 69.XXX.YYY.46 | nyc | nwr | phi | wdc | bos |
| 66.XXX.YYY.212 | nyc | nwr | phi | wdc | bos |
| 65.XXX.YYY.11 | nyc | nwr | phi | bos | wdc |
| 205.XXX.YYY.63 | mia | atl | orl | tmp | ral |
| 72.XXX.YYY.133 | wdc | phi | nyc | nwr | ral |
| 69.XXX.YYY.51 | atl | mia | dal | tmp | orl |

This can be further simplified by combining entries where the rack gateway sequences are the same and the resolver IP addresses are in close proximity to each other (and no other resolver IP addresses are in between).

TABLE 2

Sample Combined Rack (Gateway) matrix

| res_ip_begin | res_ip_end | gw_1 | gw_2 | gw_3 | gw_4 | gw_5 |
|---|---|---|---|---|---|---|
| 97.242.AB.123 | 97.242.CD.456 | wdc | phi | nyc | pit | nwr |
| 99.111.AB.123 | 99.111.CD.456 | nyc | nwr | phi | bos | wdc |
| 72.176.AB.123 | 72.176.CD.456 | nyc | nwr | wdc | phi | bos |
| 97.231.AB.123 | 97.231.CD.456 | nyc | nwr | phi | bos | wdc |
| 72.251.AB.123 | 72.251.CD.456 | nyc | nwr | phi | wdc | bos |
| 64.89.AB.123 | 64.89.CD.456 | wdc | phi | pit | nyc | nwr |
| 72.253.AB.123 | 72.253.CD.456 | wdc | phi | pit | nyc | nwr |
| 66.196.AB.123 | 66.196.CD.456 | nyc | nwr | phi | bos | wdc |

TABLE 2-continued

Sample Combined Rack (Gateway) matrix

| res_ip_begin | res_ip_end | gw_1 | gw_2 | gw_3 | gw_4 | gw_5 |
|---|---|---|---|---|---|---|
| 205.81.AB.123 | 205.81.CD.456 | atl | ral | cin | orl | tmp |
| 109.15.AB.123 | 109.15.CD.456 | nyc | nwr | phi | bos | wdc |

Figure 5:
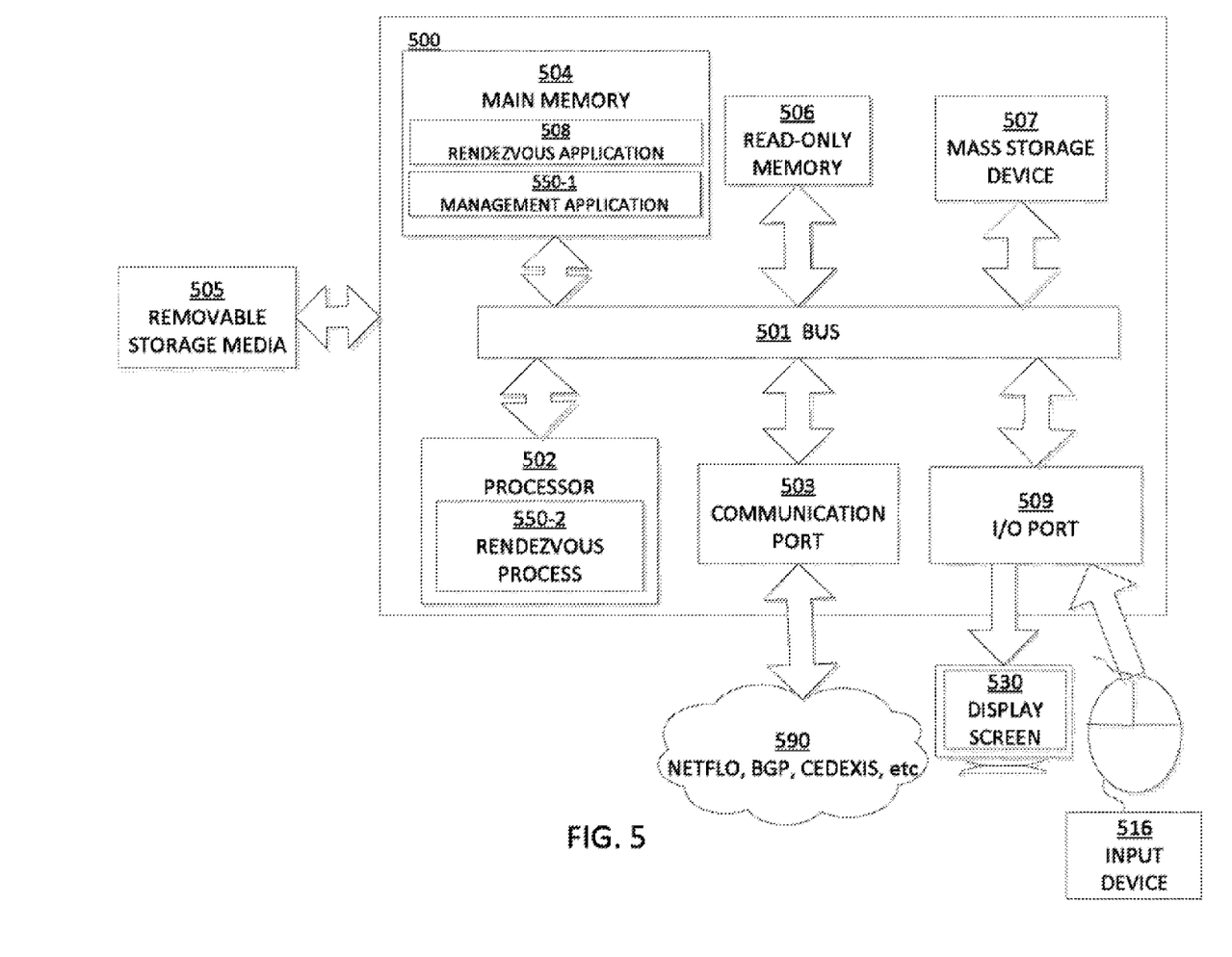
FIG. 5 is an example general purpose computing system that may form a special purpose computer to perform the methods discussed herein, to perform DNS resolution, or to provide other functions discussed herein.

FIG. 5 is example schematic diagram of a computing system 500 implementing a rendezvous application 508 that may collect the various data discussed herein, and process the data to obtain the portion of each client's use of a resolver, which may be at a /24 resolution and which may be saved in a database as a client-to-resolver matrix. The rendezvous application may further obtain the distance between clients and CDN racks, and create a client-to-rack distance matrix. Finally, the rendezvous application may multiply the data sets, such as by linearly multiplying the matrices, to create an output matrix. The output matrix may then be used to update DNS routing tables used in resolving a request. The computing system for the rendezvous application 508 includes a bus 501 (i.e., interconnect), at least one processor 502, at least one communication port 503, a main memory 504, a removable storage media 505, a read-only memory 506, and a mass storage device 507. Processor(s) 502 can be any known processor, such as, but not limited to, an Intel® Itanium® or Itanium 2® processor(s), AMD® Opteron® or Athlon MP® processor(s), or Motorola® lines of processors. Communication port 503 can be any of an RS-232 port for use with a modem based dial-up connection, a 10/100 Ethernet port, a Gigabit port using copper or fiber, or a USB port. Communication port(s) 503 may be chosen depending on a network such as a Local Area Network (LAN), a Wide Area Network (WAN), or any network to which the computer system 500 connects. The rendezvous application may be in communication with peripheral devices (e.g., display screen 530, input device 516 via Input/Output (I/O) port 509).

Main memory 504 can be Random Access Memory (RAM) or any other dynamic storage device(s) commonly known in the art. Read-only memory 506 can be any static storage device(s) such as Programmable Read-Only Memory (PROM) chips for storing static information such as instructions for processor 502. Mass storage device 507 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 501 communicatively couples processor(s) 502 with the other memory, storage and communications blocks. Bus 501 can be a PCI/PCI-X, SCSI, or Universal Serial Bus (USB) based system bus (or other) depending on the storage devices used. Removable storage media 505 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 504 is encoded with the rendezvous application 550-1 that supports functionality as discussed above and as discussed further below. For example, in one embodiment, the management application 550-1 may include or otherwise implement the various processes and/or instructions described herein. The management application 550-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 502 accesses main memory 504 via the use of bus 501 in order to launch, run, execute, interpret or otherwise perform the logic instructions of the rendezvous application 550-1.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of serving content comprising:
    determining a portion of traffic between client devices within a first autonomous system and client resolvers within the first autonomous system;
    determining distance information between the client devices and content servers within a second autonomous system, the distance information related to egress of content from at least one of the content servers via at least one egress gateway of the second autonomous system to the first autonomous system;
    determining a network location between the client resolvers and the content servers using the determined portion of traffic and the determined distance information; and
    serving content to at least one of the client devices from at least one of the content servers based on the determined network location.

2. The method of claim 1, wherein the portion of traffic is expressed in a client-to-resolver matrix, the distance information is expressed in a client-to-gateway distance matrix, and the network location between the client resolvers and the content servers is created by a matrix product of the client-to-resolver matrix and the client-to gateway distance matrix.

3. The method of claim 2, wherein the portion of traffic includes a client metric wherein the client metric is used to populate the client-to-resolver matrix.

4. The method of claim 3, wherein the client metric is a geographic identifier for a client device.

5. The method of claim 4, wherein the geographic identifier is a latitude and longitude attribute associated with a client device.

6. The method of claim 2, wherein the portion of traffic is a proportion of client devices within a first autonomous system accessing the client resolvers within the first autonomous system, the client-to-resolver matrix is a representation of at least one of a client's use of at least one resolver, and the client-to-gateway distance matrix is a representation of a distance between at least one client device and at least one content server.

7. The method of claim 6, wherein a routing table is used to select a content server for at least one client device.

8. The method of claim 1, further comprising:
    sorting the network location between the client resolvers and the content servers based on a distance between each of the content servers and the client resolvers; and
    preferring the content server based on a shortest distance of the sorted network location.

9. An apparatus comprising:
    at least one computing device in communication with a non-transitory storage media including computer executable instructions to perform operations comprising:
        determine a portion of traffic between client devices within a first autonomous system and client resolvers within the first autonomous system;
        determine distance information between the client devices and content servers within a second autonomous system, the distance information related to egress of content from at least one of the content servers via at least one egress gateway of the second autonomous system to the first autonomous system;
        determine a network location between the client resolvers and the content servers using the determined portion of traffic and the determined distance information; and
        serve content to at least one of the client devices from at least one of the content servers based on the determined network location.

10. The apparatus of claim 9, wherein the portion of traffic is expressed in a client-to-resolver matrix, the distance information is expressed in a client-to-gateway distance matrix, and the network location between the client resolvers and the content servers is created by a matrix product of the client-to-resolver matrix and the client-to gateway distance matrix.

11. The apparatus of claim 10, wherein the portion of traffic is a proportion of client devices within a first autonomous system accessing the client resolvers within the first autonomous system, the client-to-resolver matrix is a representation of at least one of a client's use of at least one resolver, and the client-to-gateway distance matrix is a representation of a distance between at least one client device and at least one content server.

12. The apparatus of claim 11, wherein a routing table is used to select a content server for at least one client device.

13. The apparatus of claim 10, wherein the portion of traffic includes a client metric wherein the client metric is used to populate the client-to-resolver matrix.

14. The apparatus of claim 13, wherein the client metric is a geographic identifier for a client device.

15. The apparatus of claim 14, wherein the geographic identifier is a latitude and longitude attribute associated with the client device.

16. The apparatus of claim 9, wherein the computer executable instructions are further configured to perform the operations of:
    sort the network location between the client resolvers and the content servers based on a distance between each of the content servers and the client resolvers; and
    prefer the content server based on a shortest distance of the sorted relationship.

17. A computing device in a first autonomous system, the computing device comprising at least one memory for storing instructions that are executed by at least one processor to:
    determine a portion of traffic between client devices within the first autonomous system and client resolvers within the first autonomous system;

determine distance information between the client devices and content servers within a second autonomous system, the distance information related to egress of content from at least one of the content servers via at least one egress gateway of the second autonomous system to the first autonomous system;

determine a network location between the client resolvers and the content servers using the determined portion of traffic and the determined distance information; and serve content to at least one of the client devices from at least one of the content servers based on the determined network location.

18. The computing device of claim 17, wherein the portion of traffic is expressed in a client-to-resolver matrix, the distance information is expressed in a client-to-gateway distance matrix, and the network location between the client resolvers and the content servers is created by a matrix product of the client-to-resolver matrix and the client-to gateway distance matrix.

19. The computing device of claim 18, wherein the portion of traffic is the proportion of client devices within a first autonomous system accessing the client resolvers within the first autonomous system, the client-to-resolver matrix is a representation of at least one of a client's use of at least one client resolver, and the client-to-gateway distance matrix is a representation of the distance between at least one client device and at least one content server.

20. The computing device of claim 19, wherein a routing table is used to select a content server for at least one client device.

* * * * *